ENHANCED FARADAY ROTATION STRUCTURE

Filed April 8, 1966

INVENTOR
GEORGE J. FAN

BY George Baron
ATTORNEY

United States Patent Office 3,418,483
Patented Dec. 24, 1968

3,418,483

ENHANCED FARADAY ROTATION STRUCTURE

George J. Fan, Ossining, N.Y., assignor to International Business Machines Corporation, Armonk, N.Y., a corporation of New York Filed Apr. 8, 1966, Ser. No. 541,341
11 Claims. (Cl. 250—225)

ABSTRACT OF THE DISCLOSURE

The disclosure is for a device for enhancing the Faraday effect. When a transparent isotropic medium is in a strong magnetic field, there is a rotation of the plane of vibration of polarized light which is transmitted through the medium in the direction of the field. The angle of rotation is a function of the length of the path traversed in a magnetic field of a given strength and of the material through which the polarized light passes. Such Faraday effect is enhanced by depositing a transparent ferro-magnetic layer, for example, europium oxide, on a dichroic mirror and then depositing a dielectric layer onto the transparent magnetic layer.

This invention relates to readout techniques for magnetic memories, and more particularly to the readout of thin film magnetic memories.

Magnetic films can be made to store binary bits of information by controlling the polarity of the magnetic field stored at a given spot of such films. For example, the writing of a north pole magnetic orientation at a given spot of the film would be indicative of the storage of a "1" and the writing of a south pole orientation would be indicative of a "0." Conventional readout means will comprise a slotted magnet armature or wire that passes over the magnetized spot, causing a voltage to be induced in the latter. The polarity of such induced voltage is sensed to determine the binary state of the interrogated bit.

Another technique for readout of information stored in magnetic films or tapes employs a method of optically sensing the reflection from a spot on a magnetic film as a means for determining the binary state of such spot. The particular type of readout employed, and the one towards which this invention is directed, is referred to in the literature as the "magneto-optical Kerr effect." When polarized light impinges upon a magnetic film or material, the plane of polarization of the impinging light is rotated upon reflection, the sign of the rotation depending upon the polarity of the magnetic field stored in the film or material. This rotational effect, by itself, has proved to be very slight, making it difficult or impractical to correlate such slight rotation of the plane of polarization with the magnetic storage in the film.

Consequently, if one can enhance such magneto-optical effect, one should be able to achieve a greater signal in the readout process employing the magneto-optical effect. If the polarized light is employed as an interrogating light source, any substantial enhancement of such rotational effect would greatly improve the readout capabilities of a system that relies upon the magneto-optical effect as a method for reading the information stored in magnetic film.

The present invention achieves such enhancement of the magneto-optical effect by using a magnetic film in conjunction with a dielectric layer and a dichroic mirror. Deposited upon a dichroic mirror is another film of material that is a transparent magnetic ferromagnetic substance that has a high Verdet constant such as the europous chalcogenides and garnets. A dielectric film is the last deposited layer placed upon the transparent ferromagnetic substance. The interrogating light, when played upon the "sandwich" comprising the dichroic mirror, the magnetic material (having been previously magnetized by conventional means so as to store binary information) and the dielectric layer will greatly enhance the magneto-optical effect. The enhancement is achieved because the polarized interrogating light, when passing through the transparent ferromagnetic material, such as EuO, or compensated garnets and the like, suffers very little absorption loss but does have its plane of polarization rotated; furthermore, the dichroic mirror reflects the polarized light after its passage through the EuO back again towards the dielectric layer, such reflection taking place with negligible attenuation save that caused by the EuO. The resultant rotation of the plane of polarization as it appears above the top dielectric layer is many times greater than would exist were only the magneto-optical effect relied upon as a method of retrieving magnetically recorded information.

Consequently, it is an object of this invention to provide improved means for retrieving magnetically recorded information.

It is yet another object to provide means for enhancing the magneto-optic effect.

Still another object is to employ a transparent ferromagnetic substance having a high Verdet constant as an element in a novel readout system for magnetically recorded information.

The foregoing and other objects, features and advantages of the invention will be apparent from the following more particular description of preferred embodiments of the invention, as illustrated in the accompanying drawings.

Figure 1:
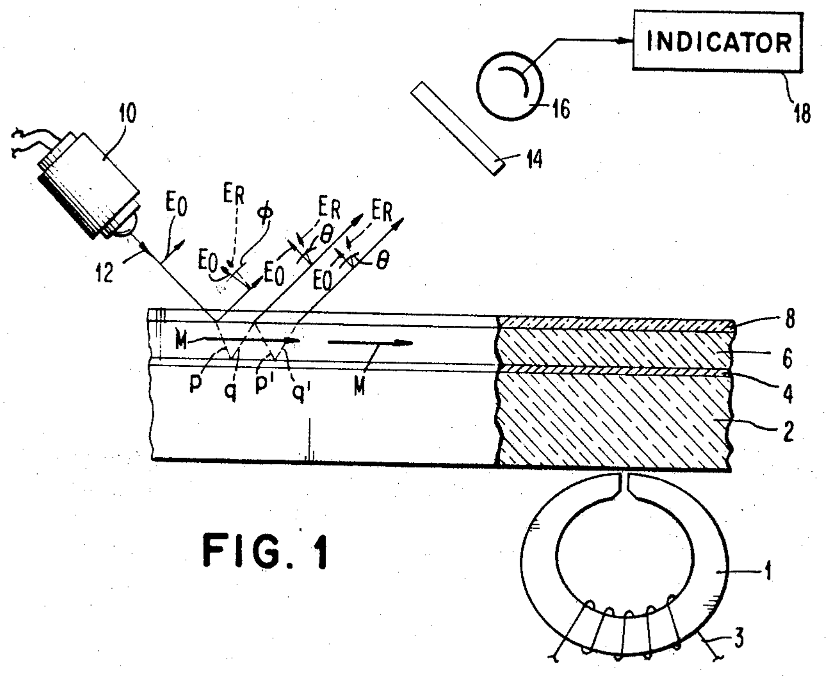
FIG. 1 is a schematic diagram of an embodiment of the invention.

As seen in FIG. 1, a substrate of glass or any neutral material provides a base for a dichroic mirror 4 of zinc sulfide, magnesium fluoride, or the like, and is constructed in a well-known manner by making a plurality of layers, one superimposed on the other and all having the proper index ratios. Adjacent said dichroic mirror 4 is a layer 6 of a europous chalcogenide, such as though not limited to europium oxide, compensated garnet, or any material that serves the role of such materials, such layer 6 being of the order of 1000 angstroms. The layer 6 should have a high Faraday rotation constant and be negligibly absorbent of visible radiation. EuO, for example, with a saturating magnetic field applied thereto, will cause the plane of polarization of polarized light passing through it to rotate, in the case of EuO, approximately $3 \times 10^5$ deg./cm. The final layer 8 is a thin dielectric film of about 100–300 angstroms. A representative dielectric material is silicon monoxide.

A laser source or any other form of polarized light 10, whose plane of polarization represented by vector $E_O$ is perpendicular to light beam 12, is directed at information storing member 6 wherein bits of information are stored as localized fields M. Element 14 is a conventional analyzer that is constructed to transmit light having a predetermined plane of polarization and photocell 16 senses such transmitted light. A recording instrument 18 indicates the presence of such transmitted light.

Prior to applying the novel readout technique to be described hereinafter, information is written into film 6. A magnetic write head 1 has a coil 3 wrapped around it, said coil receiving current pulses from a source of energy, not shown. Such a current pulse, when applied through head 1, creates a magnetic field at a spot on film 6. Different spots are recorded by relative movement of write head 1 and film 6. Other recording techniques can be employed and the method of recording is not of any consequence so long as a localized area of film 6 is magnetized and such localized spot of magnetization is representative of binary information.

When the polarized beam 12, having a plane of polarization represented by the vector $E_O$, impinges on the memory storing unit, a small portion of such beam 12 is reflected from the top surface of EuO 6 and suffers an angular rotation $\phi$, such angle $\phi$ being shown between $E_O$ and the rotated polarization plane $E_R$. This angle $\phi$ is generally quite small and not readily observable for most magnetic materials. Part of the polarized beam 12 enters the transparent magnetizable material 6 along path $p$ and is totally reflected by the dichroic material 4 and returns along path $q$ towards dielectric layer 8. The plane of polarization $E_O$ has two components along path $q$, one component is rotated and the other is not. The rotated component exists from surface 8 and produces an initial rotation $\theta$, wherein $\theta > \phi$. The nonrotated component of the plane of polarization is reflected by the dielectric film 8 and traverses the transparent magnetizable material 6 along path $p'$. The dichroic mirror reflects the additionally rotated plane of polarization along path $q'$. Such traverses are repeated until the light beam reaches the edge of the magnetized spot M on the film 6.

Figure 2:
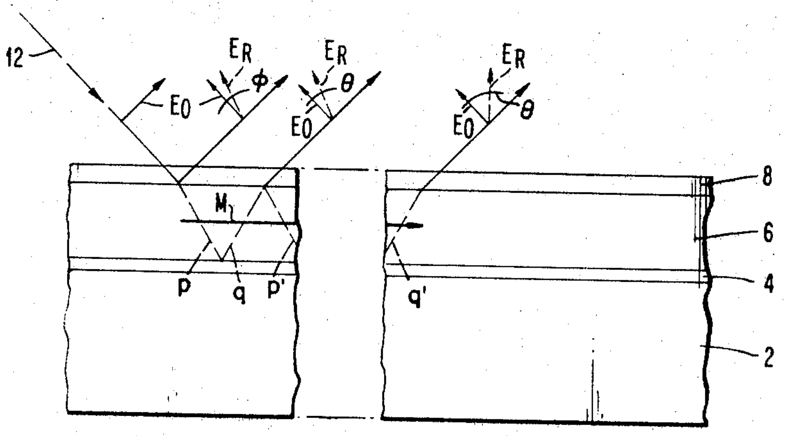
FIG. 2 is an enlarged view of the elements that comprise the major portion of the enhancement scheme of the present invention.

For each traverse through film 6, the angle $\theta$ gets larger. A magnetized spot that stores binary information would be about one mil in width. A laser beam, or other collimated polarized source, can be made to traverse, as seen in FIG. 2, a magnetized spot about twenty times before such beam goes beyond the influence of the magnetized spot. If each traverse results in an energy conversion that is the equivalent of a 2° rotation of the plane of polarization $E_O$ due to the Faraday effect, then the final angle $\theta$ of rotation of the initial plane of polarization $E_O$ would be about the equivalent of 40°. The resultant signal is sensed by conventional means such as an analyzer 14, photocell 16 and indicator 18.

If one gives an initial intensity $I_0$ to the polarized beam 12 and a final intensity I to the beam emanating from the dielectric 8, then $I/I_0 = e^{-\alpha l}$ where $\alpha$ is the coefficient of absorption of the transparent magnetizable layer 6 and $l$ is the length of passage through the magnetizable layer 6 of the polarized light beam 12. Moreover, the Faraday rotational effect $\theta$ of layer 6 can be represented by the equation $\theta \sim FlM$ where F is the Verdet constant, $l$ is the length of the path of light beam 12 through layer 6 and M is the unit of magnetism within layer 6. If one substitutes the value $1/\alpha$ for $l$, then $$\theta \sim \frac{F}{\alpha} M$$

For unit magnetism M, the Faraday rotation $\theta \sim F/\alpha$, the latter being a figure of merit of the material used to obtain large rotational effects. Since europium oxide has a large Verdet constant, namely, a large F, and a relatively small light absorption $\alpha$, such material is particularly desirable as a means for obtaining the enhancement of the magneto-optical effect that exists upon reflection of polarized light 12 from the surface of the magnetic material 6. The rotation due to the Faraday rotation effect practically completely masks the rotational effect due to the magneto-optic effect and thus provides a very large signal for optical readout.

Obviously, the present invention, while applied towards the optical readout of binary information stored in a transparent magnetizable medium, is useful in any optical system or device wherein a magnetic field is employed to obtain a large rotation of an initial plane of polarization of a source of light.

While the invention has been particularly shown and described with reference to preferred embodiments thereof, it will be understood by those skilled in the art that various changes in form and details may be made therein without departing from the spirit and scope of the invention.

What is claimed is:

1. Means for enhancing the magneto-optical effect comprising a substrate, a magnetizable non-metallic transparent film on said substrate, said film having a high Verdet constant, and a dichroic mirror interposed between said substrate and film.

2. Means for enhancing the magneto-optical effect comprising a substrate, a magnetizable non-metallic transparent film having a high Verdet constant on said substrate, a dichroic mirror interposed between said film and substrate, and a dielectric layer on said film.

3. Means for enhancing the magneto-optical effect comprising a substrate, a dichroic mirror on said substrate, magnetizable non-metallic transparent film having a high Verdet constant on said substrate, and a dielectric layer on said film.

4. The invention of claim 2 wherein said transparent magnetizable film is a europous chalcogenide.

5. The invention of claim 2 wherein said transparent magnetizable film is europium oxide.

6. The invention of claim 2 wherein the transparent magnetizable film is a garnet.

7. Optical readout means for retrieving magnetically recorded information comprising a dichroic mirror, a transparent non-metallic magnetizable layer having a high Verdet constant and storing such magnetically recorded information located on said mirror, means for applying polarized light to said magnetizable layer to interrogate said stored information, and means for sensing the polarized light emanating from said magnetizable layer.

8. Optical readout means for retrieving magnetically stored information comprising a dichroic mirror, a transparent non-metallic magnetizable layer adjacent said dichroic mirror, said magnetizable layer having a high Verdet constant and storing such magnetically recorded information, a dielectric layer on said magnetizable layer, means for applying polarized light onto said magnetizable layer through said dielectric layer, and means for sensing the rotation of the plane of polarization of said applied polarized light after it has passed through the magnetizable layer.

9. The optical readout means of claim 8 wherein said transparent magnetizable layer is a europous chalcogenide.

10. The optical readout means of claim 8 wherein said transparent magnetizable layer is europium oxide.

11. The optical readout means of claim 8 wherein said transparent magnetizable layer is a garnet.

References Cited

UNITED STATES PATENTS 3,224,333 12/1965 Kolk et al. ---------- 350—151

OTHER REFERENCES

"Increasing the Kerr Magneto-Optic Effect in Thin Films," by Kolk and Orlovic, Journal of Applied Physics, vol. 34, No. 4 (part 2), April 1963.

"A Multilayer Dielectric and Magnetic Film Memory Designed for Optical Read-Out," by G. O. Smith, Journal of Applied Physics, vol. 35, No. 3 (part 2), March 1964.

RALPH G. NILSON, *Primary Examiner.*

M. ABRAMSON, *Assistant Examiner.*

U.S. Cl. X.R.

350—151